Sept. 20, 1955 L. B. PERSON ET AL 2,718,554

DEVICE FOR SYNCHRONIZING RECEIVERS TO TRANSMITTERS
IN TIME DIVISION MULTIPLEX SYSTEMS

Filed April 11, 1952

Inventors
L. B. Person
C. H. Von Sivers
R. K. Wadö
K. R. Wickman
By Glascock Downing & Seebold
Attys.

United States Patent Office 2,718,554
Patented Sept. 20, 1955

2,718,554

DEVICE FOR SYNCHRONIZING RECEIVERS TO TRANSMITTERS IN TIME DIVISION MULTIPLEX SYSTEMS

Lars Bernhard Person and Carl Henric von Sivers, Stockholm, and Kurt Reid Wadö and Klas Rudolf Wickman, Hagersten, Sweden, assignors to Telefonaktiebolaget L M Ericsson, Stockholm, Sweden, a company of Sweden Application April 11, 1952, Serial No. 281,932

Claims priority, application Sweden April 30, 1951

4 Claims. (Cl. 178—69.5)

This invention relates to a device for synchronizing receivers to transmitters in time division multiplex systems. According to the principle of these systems there are periodically transmitted firstly a synchronizing pulse and after that a number of pulses after each other, each pulse belonging to a certan channel. The pulses of a channel carry a signal over from the transmitter end to the receiver end by being modulated e. g. with regard to their amplitude, duration or time position. At the receiving end the synchronizing pulses shall be able to be selected from the multichannel pulse train in order to synchronize the receiver to the transmitter. Because of that they usually have another shape than the channel pulses, e. g. they may have a greater duration or amplitude than these, or they may consist of two or more closely to each other following pulses with exactly determined time intervals from each other. The synchronizing pulses are usually not modulated contrary to the channel pulses.

Another method of synchronizing has been described in the journal: Bell Laboratories Record, February 1949, pages 62–66. According to this method the synchronizing pulses are amplitude modulated by an oscillation, the frequency of which is the same as half the repetition frequency of the synchronizing pulses, every second synchronizing pulse being suppressed. This method has some advantages. Thus the synchronizing channel does not require more time space for each period than the duration of the synchronizing pulse. Further the synchronizing pulses may have the same shape as the channel pulses.

This invention relates to a device for synchronizing receivers to transmitters, when the synchronizing pulses are amplitude modulated by an oscillation, the frequency of which is a submultiple to the repetition frequency of the synchronizing pulses. A comparison of the time positions of the pulse train incoming to the receiver end to the time positions of a pulse train generated by a pulse generator at the receiver end will give a control voltage, which is arranged to regulate the local pulse generator in such a way, that the two pulse trains are caused to be automatically synchronized.

Figure 1:
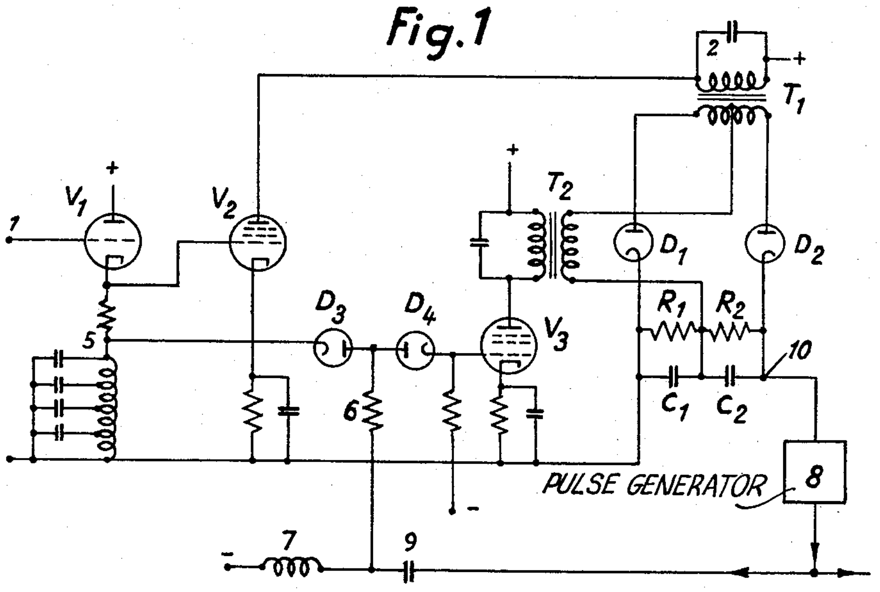
Figure 2:
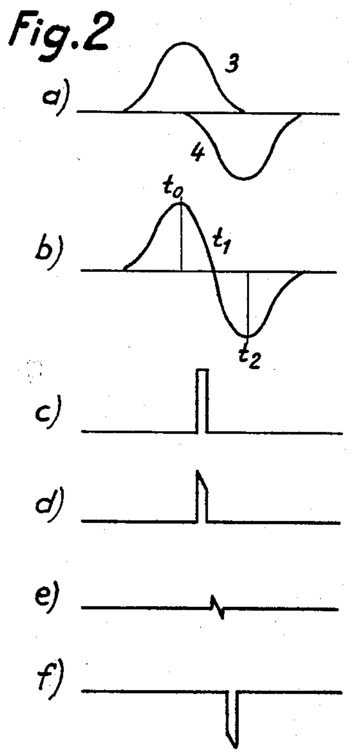
Figure 3:
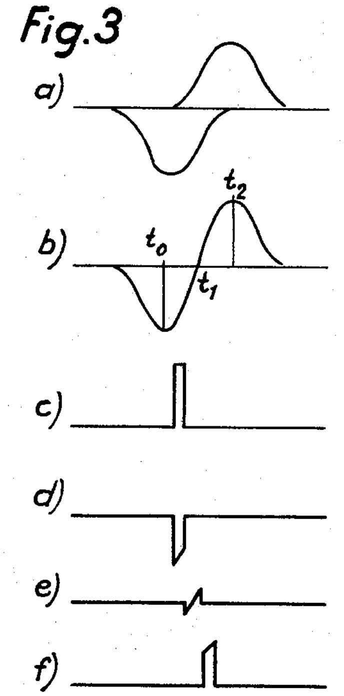

The invention will be closer described in connection with the accompanying drawing, where Fig. 1 shows a device according to the invention and Figs. 2 and 3 show wave forms of voltages in different parts of the device.

Fig. 1 shows a device for synchronizing and locking a pulse train generated by a local pulse generator to an incoming pulse train, where the synchronizing pulses are amplitude modulated by an oscillation, the frequency of which is equal to half the repetition frequency of the synchronizing pulses, in such a manner that the synchronizing pulses every other time are positive and every other time negative. The incoming pulse train is applied to the grid of tube $V_1$, the anode of which is directly connected to a positive voltage and the cathode of which is connected to ground via a resistor in series with a delay network. The end of the delay network, which is connected to ground, is short-circuited. From the cathode of $V_1$ the whole pulse train is applied to the grid of the tube $V_2$. A resonant circuit 2 is connected to the anode of this tube, which circuit is tuned to half the repetition frequency of the synchronizing pulses. Thus the anode impedance of the tube $V_2$ is high for said frequency but low for other frequencies. Because of that the amplification of the tube $V_2$ will be high for said frequency but low for other frequencies. Thus the voltage of said frequency in the pulse train is filtered out by said circuit and applied via the transformer $T_1$ to a phase sensitive discriminator of known construction, which discriminator consists of the transformers $T_1$ and $T_2$, the diodes $D_1$ and $D_2$, the resistors $R_1$ and $R_2$ and the condensers $C_1$ and $C_2$. In Fig. 2*a* 3 is an incoming pulse. After being reflected in the short-circuited delay network the pulse has changed its polarity and is delayed to pulse 4. A wave form according to Fig. 2*b* is obtained in point 5 by superposing the pulse of changed polarity on the initial pulse. Point 5 is connected to the control grid of the tube $V_3$ via two diodes $D_3$ and $D_4$ connected in series. The anodes of those diodes are connected to each other and via a resistor 6 and a coil 7 to a negative bias causing the diodes $D_3$ and $D_4$ normally to be a non-conducting state. From the pulse generator 8 positive pulses of the same repetition frequency as that of the synchronizing pulses are applied via the condenser 9 and the resistor 6. Thus the diodes $D_3$ and $D_4$ are made conducting and during these times the voltage of point 5 is transmitted as an amplitude modulated pulse train to the grid of tube $V_3$. Because the synchronizing pulses are amplitude modulated by an oscillation of half the repetition frequency of the synchronizing pulses, these pulses thus being positive every other time and negative every other time, a wave form is obtained in point 5, this wave form every other time being as in Fig. 2*b* and every other time as in Fig. 3*b*. If the pulses applied via the resistor 6 occur just before the time $t_1$ (defined according to Figs. 2*b* and 3*b*), a positive pulse according to Fig. 2*d* is obtained every other time and a negative pulse according to Fig. 3*d* is obtained every other time at the grid of the tube $V_3$. The repetition frequency of this pulse train is thus the same as that of the pulse train obtained from the pulse generator 8, i. e. the same as the repetition frequnecy of the synchronizing pulses. The pulse train at the grid of the tube $V_3$ is thus amplitude modulated by an oscillation, the frequency of this being the same as half the repetition frequency of the synchronizing pulses. The modulation of the pulse train obtained at the grid of the tube $V_3$ has further the same phase as the modulation of the synchronizing pulses at the grid of the tube $V_2$ in said case, where the pulses generated by the pulse generator 8 occur just before the time $t_1$. This will directly appear from Figs. 2 and 3. When, according to Fig. 2*a*, the applied synchronizing pulse 3 is positive, the pulse obtained at the grid of the tube $V_3$ will also be positive according to Fig. 2*d*, and when according to Fig. 3*a*, the applied synchronizing pulse is negative, the pulse obtained at the grid of the tube $V_3$ will also be negative according to Fig. 3*d*. If on the other hand the pulses generated by the pulse generator 8 occur just after the time $t_1$, a negative pulse according to Fig. 2*f* will be obtained at the grid of the tube $V_3$, if the applied synchronizing pulse 3 is positive according to Fig. 2*a*, and a positive pulse according to Fig. 2*f*, if the applied synchronizing pulse is negative according to Fig. 3*a*. Thus in this case the modulation of the pulse train obtained at the grid of the tube $V_3$ has the opposite phase as that of the modulation of the synchronizing pulses at the grid of the tube $V_2$. The anode impedance of the tube $V_3$ consists of an oscillation circuit, which is tuned to half the repetition frequency of the synchronizing pulses. The anode impedance of the tube $V_3$ is thus high for said frequency but low for other frequencies. The amplification of the tube $V_2$ will thus be high for said frequency but low for other frequencies. In the anode circuit of this tube a voltage of the same frequency as half the repetition frequency of the synchronizing pulses is thus filtered out and applied via the transformer $T_2$ to the phase sensitive discriminator mentioned before. The voltages, which are applied to the phase sensitive discriminator via the transformer $T_1$ respectively $T_2$, will thus have the same phase or the opposite phase depending upon if the pulses generated by the pulse generator 8 are coming before or after the time $t_1$. A control voltage is obtained in point 10 of the phase sensitive detector, the polarity of said voltage being determined by the phase of the voltage in the anode circuit of the tube $V_3$ and thus by the pulses applied via the resistor 6 coming too early or too late. The control voltage of the point 10 is applied to the pulse generator 8 as a frequency correcting voltage. The repetition frequency of the pulses generated by the pulse generator 8 will thereby be adjusted to exactly the same repetition frequency as that of the pulse train applied at 1, causing exact synchronizing to be obtained.

The sinusoidal voltages of half the repetition frequency of the synchronizing pulses shall be of the same phase or of the opposite phase at the secondary sides of the transformers $T_1$ and $T_2$, which is automatically obtained, if the two circuits are tuned to half the repetition frequency of the synchronizing pulses. The phase angle is not critical. An error of the phase of $\pm 30°$ has no importance. It would only decrease the sensibility because it is only the question of obtaining a control voltage with values around zero from the phase sensitive detector.

If a locally generated pulse according to Figs. 2*c* and 3*c* occurs during the time interval $t_0$ to $t_2$ (see Figs. 2*b* and 3*b*) an automatic adjustment of the time position of the pulse to the time $t_1$ will be obtained. If the pulse will occur at a time far away from $t_1$ no control voltage from the phase sensitive detector to the pulse generator 8 will be obtained. If then the repetition frequency of the pulse train locally generated will not be exactly the same as the repetition frequency of the pulse train applied to point 1, the time position of the pulses applied via the resistor 6 will be altered until finally regulation and locking of the time position of the pulses will be obtained.

In the device described above it has been said that the pulse train locally generated shall have the same repetition frequency as the synchronizing pulses. It may, however, also have a repetition frequency equal to the number of channels multiplied by the repetition frequency of the synchronizing pulses. In that case a faster regulation of the time position of the pulse train locally generated will be obtained.

In that case a train of pulses representing not only the synchronizing channel as has previously been presumed but also all other channels will however be obtained at the grid of the tube $V_3$. In practically all pulse systems the modulation voltages are, however, at the transmitter side applied to respective channel modulators via low pass filters, the cut off frequency of which shall be below half the repetition frequency of the pulse train, corresponding to each individual channel. In this case too it will only be the pulse train at the grid of the tube $V_3$ which train is caused by the synchronizing pulses, which will give rise to a voltage in the oscillation circuit of the anode of the tube $V_3$, which circuit is tuned to half the repetition frequency of the synchronizing pulses. Said method is directly applicable, e. g. in a repeater station when changing e. g. amplitude modulated pulses to time modulated pulses and vice versa, when changing amplitude modulated gauss-pulses of long durations into amplitude modulated rectangular pulses of short durations. The method is also applicable in a demodulator arrangement, in which case the selecting of the right channel pulse for respective channel demodulator is caused by half the repetition frequency of the synchronizing pulses, said frequency being derived directly from the pulse train and e. g. in Fig. 1 obtained from the tuned circuit 2, while gate pulses or the like, the time positions of which being exactly adjusted, will be obtained by a frequency regulation of the local pulse generator 8 of the arrangement according to Fig. 1.

In the arrangement described above the synchronizing pulses have been supposed to be amplitude modulated by half the repetition frequency of the synchronizing pulses. Of course another submultiple of the repetition frequency may also be chosen as the modulation frequency of the synchronizing pulses.

The synchronizing pulses may be amplitude modulated either between zero and a certain maximum amplitude of a positive or negative direction or also between a certain maximum amplitude of a positive direction and a certain maximum amplitude of a negative direction.

The manner of modulation of the channel pulses does not matter. They may be amplitude modulated, time position modulated or duration modulated. The messages of the respective channels may also be transferred by pulse code modulation.

We claim:

1. Apparatus for synchronizing receivers to transmitters in pulse multiplex systems, in which the synchronizing pulses are amplitude modulated by an oscillation whose frequency is a submultiple of the repetition frequency of the synchronizing pulses, comprising input terminals to which a train of pulses is applied, a multi-electrode tube, a delay network connected at one end to the cathode of said tube, the grid of said tube connected to the pulse train, the other end of said network being short-circuited and connected to earth, a second tube whose control grid is connected to the cathode of said first mentioned tube, a resonant circuit tuned to the said submultiple of the pulse repetition frequency connected to the anode of said second tube, a local pulse generator, an electronic switch connected to said local pulse generator for control thereby, a phase sensitive bridge, said bridge being connected to said input terminals through said resonant circuit, means for applying the output of said bridge to said local pulse generator for correcting the frequency thereof, a second resonant circuit tuned to the same submultiple frequency, and a third tube connected to the said second resonant circuit and to the output terminals of said electronic switch.

2. In a pulse multiplex system apparatus for synchronizing receivers to transmitters of the type in which the synchronizing pulses are amplitude modulated by an oscillation whose frequency is a submultiple of the repetition frequency of the synchronizing pulses, comprising input terminals to which a train of pulses is applied, a first multi-electric tube, a delay network connected at one end to the cathode of said first tube, the grid of said first tube connected to one of the said input terminals, the other end of said delay network being short circuited and connected to earth, a second multi-electrode tube, the control grid of said second tube connected to the cathode of the said first tube, a first resonant circuit tuned to the said submultiple of pulse repetition frequency and connected to the anode of said second tube, a local pulse generator, an electronic switch connected to said local pulse generator for control thereby, a third multi-electrode tube, the control grid of said third tube connected to the said one end of said delay network through said electronic switch, a second resonant circuit tuned to the said submultiple of pulse repetition frequency and connected to the anode of said third tube, and a phase sensitive bridge coupled to said second and third tubes through the respective resonant circuits and connected to said local pulse generator for correcting the frequency thereof.

3. The invention as set forth in claim 2, wherein the said first and second resonant circuits include transformers to couple the pulses from the said second tube and third tube to the said phase sensitive bridge.

4. The invention as set forth in claim 3, wherein the said electronic switch comprises two diode tubes having the anodes thereof connected together and to the output of said local pulse generator.

References Cited in the file of this patent

UNITED STATES PATENTS 2,480,582 Houghton ---------------- Aug. 30, 1949